E. B. STIMPSON.
ENVELOP FASTENER.
APPLICATION FILED JUNE 19, 1909.

954,479.

Patented Apr. 12, 1910.

Attest:
Sara G. Rourke
Edna A. Moreland

Inventor:
Edwin Ball Stimpson
by E. W. Chen Jr.
his Atty.

UNITED STATES PATENT OFFICE.

EDWIN BALL STIMPSON, OF NEW YORK, N. Y., ASSIGNOR TO EDWIN B. STIMPSON COMPANY, A CORPORATION OF NEW YORK.

ENVELOP-FASTENER.

954,479.  Specification of Letters Patent.  Patented Apr. 12, 1910.

Application filed June 19, 1909. Serial No. 503,122.

*To all whom it may concern:*

Be it known that I, EDWIN BALL STIMPSON, a citizen of the United States, and resident of Brooklyn, in the county of Kings, city and State of New York, have invented certain new and useful Improvements in Envelop-Fasteners, of which the following is a specification.

The object of my present invention is an improved envelop fastener, the advantage of which will appear from an understanding of the annexed specification and drawings.

Figure 1:
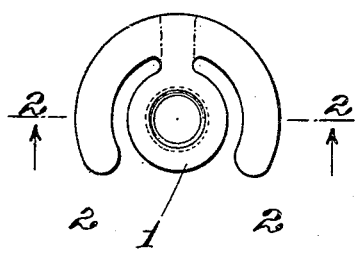
Figure 2:
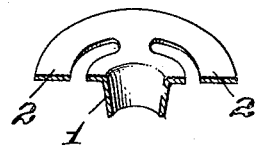
Figure 3:
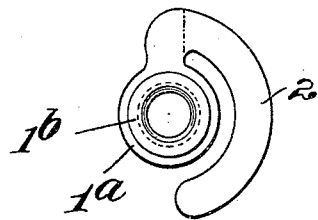
Figure 4:
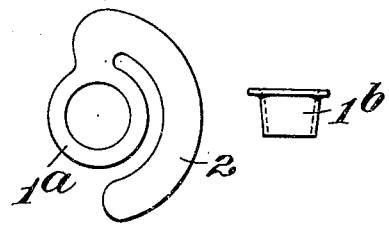

In the drawings, which show two forms of envelop fastener within my invention, Figure 1 is a top plan view of such a fastener, Fig. 2 is a vertical section partly in perspective of the fastener in Fig. 1 on the line 2—2 looking in the direction of the arrows, Fig. 3 is a top plan view of a modification, and Fig. 4 shows the two parts detached of the fastener of Fig. 3.

Describing now the fastener of my invention with particular reference to the devices of the drawings and reserving it to the claims to point out the novel features and to define the scope of the invention, the fastener of Figs. 1 and 2 comprises an eyelet 1, and a pair of oppositely directed prongs 2 curving about the periphery of the eyelet.

The modification in Fig. 3 differs in showing only a single prong 2, said prong curving more or less concentrically around the eyelet. It further differs in that the securing base is made up of two parts, an apertured member 1ᵃ from which the prong 2 springs, and an eyelet 1ᵇ seated in the aperture. The prongs when bent up preparatory to inserting them through the opening in the envelop flap, do so along the dotted lines. They are then flattened down against the envelop to hold the flap closed.

Among the advantages of the fastener are that in manufacturing it, the cut-out and waste stock is reduced to a minimum. Also when the prong-means, whether consisting of one or two prongs, has been bent up, it forms a hook to receive over it the envelop-flap opening.

Having thus described my invention, what I claim is:

1. An envelop fastener comprising a base securing the fastener to the envelop, and a pair of oppositely directed prongs attached by one side of their bases to the edge of the securing base and extending rearwardly relative to said securing base, that is, having a general direction toward said base as distinguished from a direction away from it, whereby a fastener is obtained which is operated by bending its prongs on lines extending transversely across their bases.

2. An envelop fastener comprising a base securing the fastener to the envelop, and elbow-shaped prong-means extending about the contour of the securing base, said prong-means having one side of the base thereof attached to the securing base, whereby a fastener is obtained which is operated by bending its prong-means transversely across the base of said prong-means.

Witness my hand this 28th day of May 1909, at New York city.

EDWIN BALL STIMPSON.

Witnesses:
E. W. SCHERR, Jr.,
ROBT. H. THOMSON.